Patented Feb. 6, 1940

2,189,736

UNITED STATES PATENT OFFICE 2,189,736

AGE RESISTER

Werner M. Lauter, Kalamazoo, Mich., assignor to Wingfoot Corporation, Wilmington, Del., a corporation of Delaware No Drawing. Application April 9, 1935, Serial No. 15,375

12 Claims. (Cl. 260—809)

This invention relates to a method of making rubber products having increased resistance to ageing and to the products so prepared.

Various chemical compounds have been incorporated in rubber prior to vulcanization for the purpose of improving the resistance of the rubber product to deteriorating influences, such as the effect of air, heat, light, flexing, etc. It has now been found that products obtained by reacting terpene compounds with aromatic amines are efficient age resistors in rubber and also tend to prevent tread-cracking, the terpenyl aryl amines, however formed, having a marked influence in prolonging the useful life of the rubber. It is, accordingly, an object of the invention to provide a method of treating rubber with terpenyl aryl amines to produce an article having improved resistance to ageing and cracking. Another object of the invention is to provide rubber products having had associated therewith a terpenyl aryl amine substance which increases the resistance of the product to ageing and tread cracking. Other objects will in part be obvious and will in part appear hereinafter.

The antioxidants herein described may be prepared according to the method set forth in German Patent No. 290,938, the products having the general formula $C_{10}H_{17}$—NH—R, in which R is an aromatic radical, but higher boiling fractions varying, perhaps, from this general formula, also have pronounced age-resisting properties in rubber. By this method, which will be exemplified below, spirits of turpentine, or turpentine oil, may be reacted with one, or two, or more of a large number of primary aromatic amines. Where American turpentine oil is used, containing about 90% of pinenes, a pinene aryl amine is probably obtained. The separated and isolated pinenes may be similarly reacted, either the alpha or beta pinene, or a mixture of both, being reacted with the selected amine. Other terpenes, or natural products containing such terpenes, may be used, as, for example, limonene, dipentene, sesqui terpenes and the like. The terpene body and the aryl amine are preferably brought together in mol to mol ratio to form fixation products of the two, although these proportions may be varied somewhat.

The primary aromatic amines used are any of those ordinarily available as, for example, aniline, ortho-, meta- or para toluidine, any of the six isomers of xylidine, para phenylene diamine or its isomers, meta toluylene diamine or its isomers, alpha or beta naphthylamine, para amino diphenylamine or its isomers, benzidine, tolidine, anisidine, phenetidine, p-p' diamino diphenyl methane, and other compounds containing a primary amino group.

In order to obtain the reaction product of the amine and the terpene body, a small amount of a salt of the aromatic base or of a metal salt should be present in order to effect the formation of the desired terpenyl amines. As examples of the process but to which, however, the invention is not limited, the following are given:

EXAMPLE 1.—Terpenyl aniline 1250 grams of spirits of turpentine (90% pinenes), 1000 grams of aniline, 125 grams of aniline hydrochloride and 100 grams of zinc chloride are refluxed for 10 hours at 200°–210° C. The resulting product is washed with NaOH and then steam is passed through it until the unreacted terpenes and aniline have been removed. The residual oil is taken up with benzene, filtered and the benzene distilled off. About 1554 grams of a crude reaction product are obtained. This product is then fractionally distilled to yield two main portions having, (a) a boiling point of 205°–210° C. at 25 mm. pressure and, (b) a boiling point of 220°–290° C. at 12 mm. pressure. Each of these fractions has been tested in rubber and is found to confer age-resisting properties on the rubber.

EXAMPLE 2.—Terpenyl beta naphthylamine

In another example, 360 grams of spirits of turpentine (90% pinenes), 360 grams of beta naphthylamine and 45 grams of beta naphthylamine hydrochloride are refluxed for six hours. The product is purified with NaOH and steam, 631 grams of residual product being obtained. About 51% of this product can be isolated by fractional distillation in vacuo as a viscous oil boiling between 220°–310° C. at 17 mm. pressure. This fraction was tested in rubber with good results.

Other reaction products may be specifically mentioned as illustrative. Thus, pinene, aniline and aniline hydrochloride, yield a product of the probable formula $C_{10}H_{17}NHC_6H_5$, acting as an antioxidant in rubber. Dipentene plus aniline and its chlor hydrate also give a useful product, as do dipentene, p-toluidine and toluidine hydrochloride, when reacted together. Dipentene and toluylene diamine likewise react in a similar manner.

In determining the efficiency of these products, and similar products, in rubber, a rubber formula of the following composition was used:

| | Parts by weight |
|---|---|
| Extracted rubber | 100 |
| Zinc oxide | 5 |
| Sulphur | 3 |
| Stearic acid | 1.5 |
| Hexamethylene tetramine | 1 |
| Antioxidant | 1 |

Test samples made up in accordance with the formula were subjected to low temperature tests for six days in an oxygen bomb at 50° C. and 150 pounds pressure and the following results obtained:

| Cure in minutes | Tens. | Elg. | 500% | 700% | Tens. | Elg. | 500% | 700% | Wt. inc. | Age rate |
|---|---|---|---|---|---|---|---|---|---|---|
| REACTION PRODUCT OF TURPENTINE-ANILINE, B. P. 205°-210° C./25 MM. | | | | | | | | | | |
| 35/285 | 116 | 885 | 13 | 46 | 107 | 840 | 14 | 45 | .25 | *Percent* |
| 50 | 138 | 830 | 18 | 63 | 115 | 790 | 19 | 67 | .41 | 78 |
| 70 | 169 | 775 | 27 | 106 | 108 | 700 | 28 | 108 | .67 | |
| REACTION PRODUCT OF TURPENTINE-ANILINE, B. P. 220°-290° C./12 MM. | | | | | | | | | | |
| 35/285 | 110 | 880 | 12 | 37 | 120 | 825 | 16 | 56 | .06 | |
| 50 | 140 | 835 | 17 | 60 | 137 | 790 | 19 | 78 | .09 | 106 |
| 70 | 165 | 785 | 25 | 97 | 185 | 760 | 30 | 128 | .03 | |
| REACTION PRODUCT OF TERPENYL-BETA-NAPHTHYLAMINE | | | | | | | | | | |
| 35/285 | 112 | 890 | 13 | 36 | 119 | 825 | 16 | 55 | | |
| 50 | 129 | 835 | 17 | 55 | 139 | 790 | 20 | 80 | .06 | 102 |
| 70 | 156 | 785 | 24 | 92 | 147 | 735 | 27 | 117 | .04 | |
| REACTION PRODUCT OF LIMONENE AND ANILINE, B. P. 180°-250° C./12 MM. | | | | | | | | | | |
| 35/285 | 110 | 870 | 14 | 46 | 84 | 830 | 13 | 39 | .23 | |
| 50 | 151 | 850 | 19 | 63 | 102 | 775 | 19 | 65 | .43 | 71 |
| 70 | 110 | 780 | 25 | 95 | 116 | 730 | 25 | 94 | .49 | |
| REACTION PRODUCT OF LIMONENE AND ANILINE, B. P. 250°-310° C./12 MM. | | | | | | | | | | |
| 35/285 | 103 | 880 | 13 | 38 | 96 | 825 | 14 | 46 | .11 | |
| 50 | 138 | 830 | 18 | 61 | 113 | 775 | 20 | 70 | .22 | 84 |
| 70 | 164 | 800 | 24 | 92 | 134 | 740 | 27 | 106 | .24 | |

It will be noted from the foregoing that the tensile strengths of the aged samples compare favorably with those of the unaged samples as expressed in the age rate given, which represents the ratio of this physical property in the aged and unaged samples. The weight increase is also small, this representing, generally speaking, the amount of oxygen taken up by the aged sample.

By the term "rubber", as used herein, is meant to include rubber, latex, reclaimed rubber, rubber substitutes, balata, gutta percha, and the like, whether or not admixed with fillers, pigments, vulcanizing or accelerating agents. The antioxidants may be applied to such rubber or similar materials by incorporation therein prior to vulcanization or by application to the surface of the rubber or in any other convenient manner, or they may be applied after vulcanization. Any suitable accelerator may be used in connection therewith as, for example, mercaptobenzothiazole. The new types of antioxidants are highly effective as age resistors, are comparatively inexpensive to manufacture, and are not objectionably odorous or poisonous to workmen.

Although there have been described above certain preferred embodiments of the invention, it is not intended to limit the invention to such examples since various modifications may be made therein without departing from the spirit of the invention or the scope of the appended claims. It is intended that the patent shall cover, by suitable expression in the appended claims, all features of patentable novelty residing in the invention.

What I claim is:

1. A method of preserving rubber which comprises curing a rubber composition of vulcanization characteristics in the presence of an antioxidant consisting of a reaction product of turpentine, a primary aromatic amine, and a salt of said primary aromatic amine.

2. A method of preserving rubber which comprises treating the same with a reaction product of turpentine, aniline and a aniline hydrochloride.

3. A method of preserving rubber which comprises treating the same with a reaction product of a primary aromatic amine, a salt of said primary aromatic amine and a material containing substantial quantities of a pinene.

4. A method of preserving rubber which comprises treating the same with a reaction product of limonene, aniline and an aniline salt.

5. A method of preserving rubber which comprises treating the same with a reaction product of turpentine, a naphthylamine and a salt of the naphthyl amine.

6. A method of preserving rubber which comprises treating the same with a reaction product of turpentine, beta naphthylamine and a salt of beta naphthyl amine.

7. A vulcanized rubber product comprising rubber which has been treated in the presence of the fixation product of turpentine, a primary aromatic amine and a salt of said primary aromatic amine.

8. A rubber product possessing improved age-resisting properties comprising rubber which has been vulcanized in the presence of the reaction product of limonent, aniline and a salt of aniline.

9. A rubber product possessing improved age-resisting properties comprising rubber which has been vulcanized in the presence of an antioxidant consisting of a terpene compound having the general formula $C_{10}H_{17}$—NH—R, where R is an aromatic radical.

10. A method of preserving rubber which comprises treating the same with a reaction product of a terpene body, a primary aromatic amine and one of the group consisting of a salt of the aromatic amine and a zinc salt.

11. A method of preserving rubber which comprises treating the same with a reaction product of a material consisting chiefly of terpene, a primary aromatic amine, and the hydrochloride of said primary aromatic amine.

12. A rubber product comprising rubber which has been vulcanized in the presence of the reaction product of a terpene, a primary aromatic amine and one of the group consisting of a salt of the aromatic amine and a zinc salt.

WERNER M. LAUTER.